United States Patent
Tickner et al.

[11] 3,878,832
[45] Apr. 22, 1975

[54] METHOD AND APPARATUS FOR DETECTING AND QUANTIFYING CARDIOVASCULAR MURMURS AND THE LIKE

[75] Inventors: E. Glenn Tickner, Mountain View; David G. Boyers, Palo Alto, both of Calif.

[73] Assignee: Palo Alto Medical Research Foundation, Palo Alto, Calif.

[22] Filed: May 14, 1973

[21] Appl. No.: 359,658

[52] U.S. Cl. ... 128/2.05 S; 128/2.06 R; 235/151.13
[51] Int. Cl. .............................................. A61b 5/02
[58] Field of Search ...... 128/2.05 P, 2.05 R, 2.05 S, 128/2.05 T, 2.05 A, 2.06 F, 2.06 R, 2.1 B, 128/2.1 R; 235/151.11, 151.13, 193.5

[56] References Cited
UNITED STATES PATENTS

| | | | |
|---|---|---|---|
| 2,073,457 | 3/1937 | Schwarzschild | 128/2.05 S |
| 3,318,303 | 5/1967 | Hammacher | 128/2.05 S |
| 3,339,063 | 8/1967 | Nersworthy | 235/151.13 |
| 3,648,688 | 3/1972 | O'Hanlon, Jr. et al. | 128/2.06 A |
| 3,762,397 | 10/1973 | Cage | 128/2.05 S |

*Primary Examiner*—William E. Kamm
*Attorney, Agent, or Firm*—Julian Caplan

[57] ABSTRACT

A system for extracting information concerning a defect manifested by random noise from a composite signal that includes a periodic portion and a random noise portion. The composite signal is formed into a series of time records by employing some trigger signal that identifies the beginning of the periodic signal. A series of the time records is summed to average out the random noise portion and produce a signal containing only the periodic, synchronous, signal portion. Concurrently, the composite signal time records are squared to retain the random portion as well as the synchronous portion and the same series of squared time records is summed. Subtraction of the square of the former summed signal from the latter eliminates the synchronous portion so as to produce a time record which, after being scaled by a factor 1/N, for N time records, is a measure of the power of the random noise signal. Analysis of the random noise power signal permits appraisal of the condition creating the noise signal.

9 Claims, 1 Drawing Figure

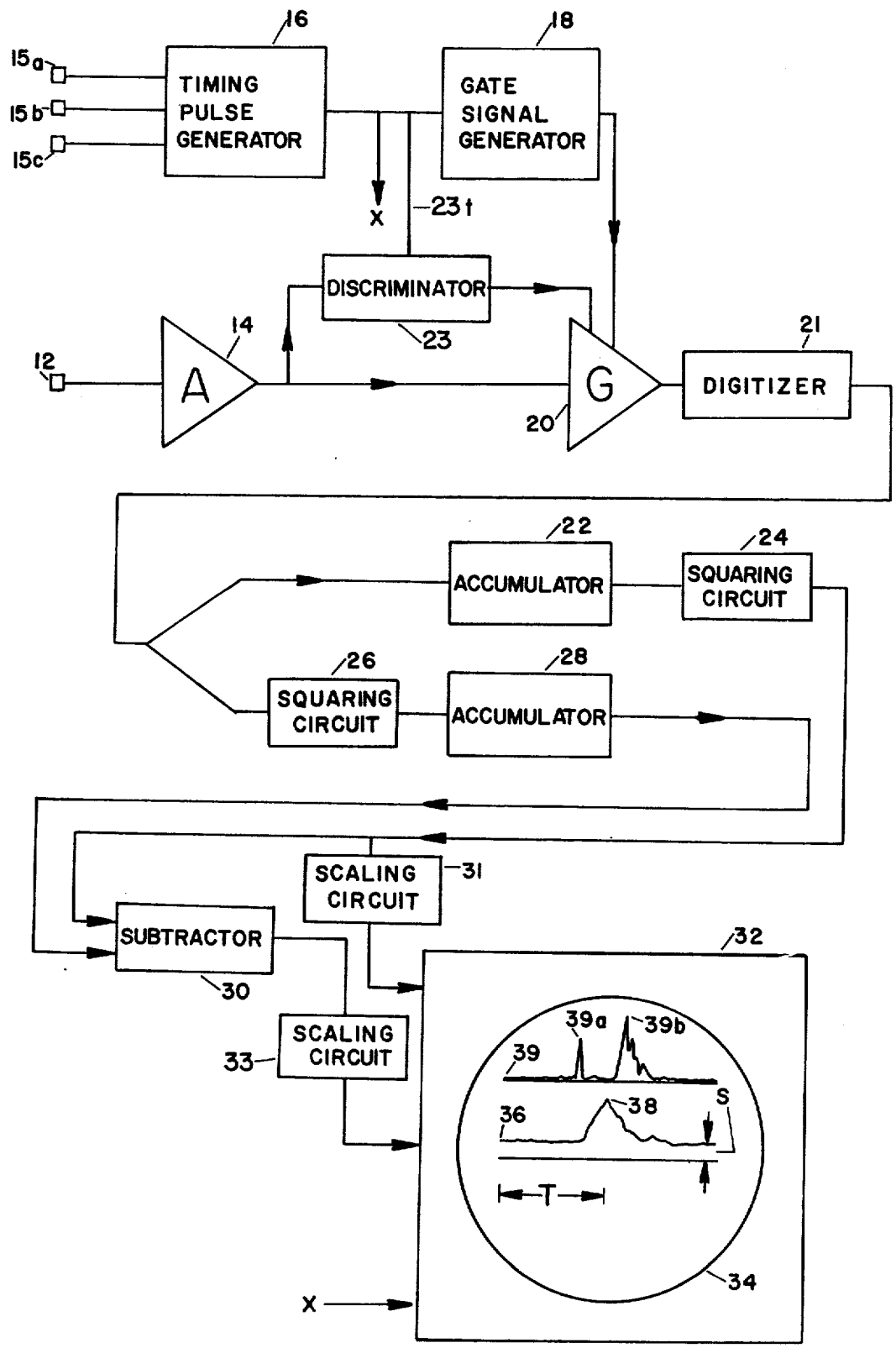

METHOD AND APPARATUS FOR DETECTING AND QUANTIFYING CARDIOVASCULAR MURMURS AND THE LIKE

This invention relates to a method and apparatus for detecting and quantifying cardiovascular murmurs and like phenomena that are characterized by random noise, in the presence of a regularly repetitive or synchronous signal. More particularly, the invention relates to a method and apparatus for detecting the presence of a cardiovascular murmur in a composite signal containing the murmur and the regularly repetitive heart sound and the time that the murmur occurs with respect to a specific event in the heartbeat cycle as manifested by the electrocardiogram or ECG.

Cardiovascular murmurs and bruits are caused by a vascular obstruction or stenosis. When blood flows through the stenosis, the blood flow becomes turbulent and is manifested by an audible signal composed of random noise. Many murmurs can be detected by auscultation but information concerning the character of a murmur depends to a large degree on the subjective judgment of the clinician. For example, descriptive terms such as "loud," "barely audible", or "Grade III", are employed.

The time that a murmur occurs during the heartbeat cycle is useful to the clinician in appraising a murmur; time measurement by auscultation is similarly imprecise. Moreover, faint or inaudible murmurs are often not detected by auscultation owing to the presence of the relatively intense heart sounds. Previous techniques have employed extensive filtering to remove these heart sounds, but they have the disadvantage of removing much of the murmur signal as well.

It is accordingly an object of the present invention to provide a method and apparatus whereby these murmur sounds can be detected and quantified thereby giving the clinician a new dimension in phonocardiography. This object is achieved in the present invention by exploiting the fact that cardiovascular murmurs are manifested by random noise. The composite sounds are formed into a series of time records, each of which has a duration approximating the period of a heartbeat and which has a beginning which is in synchronism with the contraction of the heart. Thus, if a large plurality of such time records, containing both the synchronous heartbeat sounds and the random murmur sounds, are accumulated and averaged, the noise caused by the murmur in any single heart beat is cancelled out in the average leaving only the synchronous heartbeat sound. Concurrent with the above described steps, there is accumulated for the same large number of heartbeats a sum of the squares of individual composite sound time records. Squaring each time record eliminates negative signs and therefore precludes the cancellation by the averaging out mentioned above. The square of the result of averaging the composite signal is subtracted from the aggregated or averaged squared signals so that a signal containing only the murmur power is produced which signal, in accordance with conventional techniques, can be quantified.

Additional objects, features and advantages of the present invention will be more apparent after referring to the following specification and accompanying drawing in which the sole FIGURE is a block diagram of the apparatus according to the present invention which affords practice of the method of the present invention.

Referring more particularly to the drawing, reference numeral 12 indicates a transducer or like device for sensing sounds in the body under examination. For example, transducer 12 can be a microphone placed on the chest or elsewhere on the body. Because blood flow through the stenosis is consequent upon the heartbeat, the signal detected by the transducer 12 includes both the random noise produced by blood flow past the stenosis and the periodic or synchronous heart sounds. The output of transducer 12 is thus an electric signal varying in accordance with the sound signal that is present in the body. Such output is amplified by an amplifier 14. For gating the signal in order to produce a series of time records whose duration corresponds to the period of one heartbeat, a timing signal is derived from the ECG signal. For this purpose a plurality of skin electrodes $15a$, $15b$, $15c$ are placed on the body at appropriate and well-known locations. The skin electrodes are connected to a timing pulse generator 16 which produces a timing pulse for each heartbeat; the r wave in the qrs complex of the ECG has been employed with good results.

The timing pulse from detector 16 is connected to a gate signal generator 18 which produces a gating signal that has a duration approximating the period of the heartbeat. The gating signal is used for a first of two control signals in a gate 20. The second control signal for gate 20 is supplied by an amplitude discriminator 23, and the gate is arranged to open only when both control signals are present.

The advantage of providing amplitude discriminator 23 can be appreciated by considering that the signal sensed by transducer 12 and amplified by amplifier 14 includes, in addition to the composite synchronous and random portions, a relatively slowly varying signal which arises from pressure variations caused by breathing and which modulates the amplitude of the composite signal. Adverse effects of such modulation are eliminated according to the present invention by amplitude discriminator 23, because the discriminator is adapted to include in the averaging process only those time records which have a maximum heart sound amplitude that is within a specified range or amplitude band and to reject all time records that have maximum heart sound amplitude which is outside that specified range. The discriminator contains an input circuit which essentially filters out the murmur signals to provide just the heart sounds for the discriminator circuits. The discriminator receives a timing pulse from timing pulse generator 16 on a lead $23t$ which identifies the beginning of the record. The pulse on lead $23t$ activates the discriminator so that if, during the interval the heart sound amplitude lies within the amplitude range, a second control signal for gate 20 occurs and the gate opens to pass a time record. If, on the other hand, the magnitude of the maximum heart sound signal is outside the amplitude range, no second gate control signal occurs and gate 20 remains closed. Because the breathing rate is typically one-fourth to one-fifth that of the heart rate, discriminator 23 permits gate 20 to open for only about every fourth of fifth heartbeat thereby admitting time records from the same point of each breathing cycle. Accordingly, the ability of the system to detect low intensity murmurs is improved.

To the input of gate 20 is connected the composite signal from amplifier 14 so that at the output of gate 20 is a time series of recurrent time records each of which contains both the murmur noise and the synchronous heart sounds for a single heartbeat. In order to optimize subsequent steps and circuit elements, the output signal from gate 20 is converted to digital form by a digitizer 21. Conversion to digital form is optional and not critical in the present invention. In any event, the digitized signal at the output of digitizer 21 is a series of time records, each one of which has a period of duration determined by the gating pulse, which in turn is adjusted in accordance with the heartbeat rate. At any time t after the timing pulse the magnitude X of the time record can, for the $i^{th}$ time record, be expressed by the symbol $X_i(t)$ and such symbolism will be used hereinafter and in the appended claims.

In order to average out the random noise that is indicative of the murmur, N such time records are summed in an accumulator 22 which can be any suitable storage system such as a digital or analog memory element. The greater the magnitude of N, the smaller the residual noise; in practice it has been found that after about 100 time records (N = 100) the noise due to the murmur is averaged out or cancelled for all practical purposes although useful results can be obtained by accumulating some lesser number of time records.

The output of accumulator 22 can be indicated by the following expression:

$$\sum_{i=1}^{N} X_i(t)$$

This quantity represents the sum of N time records, and if N is sufficiently large, the quantity represents only the synchronous heart signals, because of the high probability of the murmur signal in one time record being equal in magnitude and opposite in sign to the murmur signal in another time record.

Such signal is connected to a squaring circuit 24, the output of which can be expressed by the following:

$$\left(\sum_{i=1}^{N} X_i(t)\right)^2$$

and represents N times the power of the synchronous heart signal.

The series of time records from gate 20 and digitizer 21 is also fed to a squaring circuit 26, the output of which, in the symbolic notation referred to above, can be expressed as $X_i(t)^2$. Such time records contain both the power of the synchronous signals and the energy of the random noise that is indicative of the murmur. Concurrently, a series of such squared time records, N in number, is accumulated in a second accumulator 28 which is substantially identical to accumulator 22. The output of accumulator 28 can be expressed in accordance with the above symbolic notation as follows:

$$\sum_{i=1}^{N} (X_i(t))^2$$

This quantity represents the sum of N time records, which sum contains N times the power of the composite signal composed of the synchronous signal and the random noise signal.

The outputs of accumulator 28 and squaring circuit 24 are dimensionally compatible and are fed to a subtracting circuit 30. The consequence of subtracting a signal having only the synchronous signal power from a composite signal having both the synchronous signal power and the murmur power is to produce at the output of the subtracting circuit a signal indicative of the murmur power. In a digital system the data can be printed out in a table in which the magnitude of the murmur power for each of the plurality of times during the heart cycle is displayed in tabular form or on an oscilloscope 32.

In order to normalize or scale the resultant power signal so that it is representative of a time record of a single murmur, there is a scaling circuit 33 which functions to divide the signal from subtractor 30 by N. In symbolic notation the output of scaling circuit 33 is of the form $$\frac{1}{N}\left[\sum_{i=1}^{N}(X_i(t))^2 - \left(\sum_{i=1}^{N} X_i(t)\right)^2\right]$$

The same scaling function can be achieved at accumulators 22 and 28 in which event the output of the accumulator 22 is of the form $$\frac{1}{N}\sum_{i=1}^{N} X_i(t)$$

and that of accumulator 28 is of the form $$\frac{1}{N}\left(\sum_{i=1}^{N} X_i(t)\right)^2$$

Thus performance of the scaling function is important but the place or sequence of performance of scaling, before or after the subtraction step, is not important.

The murmur signal is of maximum utility to the clinician if it is correlated, in time, with the heart sounds. In order to correlate the normalized murmur power signal from scaling circuit 33 with the heart sounds, the output of squaring circuit 24 is connected to a scaling circuit 31 which is substantially identical to scaling circuit 33 in that it divides the output of the squaring circuit by N. Thus the output of scaling circuit 33 represents the power of the heart sounds and is both dimensionally compatible with and correctly time related to the murmur power at the output of scaling circuit 33.

The nature of the output derived from the apparatus and method of the present invention can be seen in the representation on the face 34 of oscilloscope 32. Reference numeral 36 designates a point that identifies the beginning of the duration of the time record and is derived from the timing pulse fed from timing pulse generator 16 on a conductor x. Spaced from point 32 by a distance T is a waveform 38, the amplitude and shape of which are indicative of the character of the stenosis and the blood flow through it. T is indicative of the timing of the murmur with respect to the ECG; for example, T indicates whether a murmur occurs during systole or during diastole. Any noise in transducer 12 or the associated circuitry is relatively constant and is indicated by the space S. It should be obvious that the same information could be outputed on an X-Y recorder, on a print-out device in tabular form or other output device.

A waveform corresponding to the normalized heart sound power from scaling circuit 31 is displayed at 39 simultaneously with the murmur waveform 38. The heart sound waveform 39 includes a spike 39a which indicates the relative timing of the first heart sound and a spike 39b which indicates the relative timing of the second heart sound. Simultaneous display of the heart sounds and the murmur in correct time relation materially assists the clinician to appraise the murmur and its cause.

In performing the method of the present invention, the apparatus of the invention operates as follows:

A composite signal containing both the synchronous signal and the noise signal is detected and converted to a corresponding composite electrical signal by transducer 12. After amplification by amplifier 14 a series of signal time records is formed by gate 20 which is opened in response to the ECG signal picked up by skin electrodes 15a, 15b, 15c and converted to a gating pulse by timing pulse generator 16 and gate signal generator 18. Only those time records within the amplitude pass band of discriminator 23 are passed. Consequently, the output of gate 20 is a series of time records each of which is a composite signal composed of a synchronous portion produced by the heartbeat and a randomly varying portion produced by the cardiovascular murmur. A series of such time records, e.g. 100, is accumulated in accumulator 22, and because the noise resulting from the murmur is of a random nature, the signal accumulated or stored in accumulator 22 has virtually no murmur noise and is composed substantially of the synchronous signal. Concurrent with the foregoing each individual time record is squared in squaring circuit 26, which eliminates any negative going noise components so that there is accumulated in accumulator 28 a signal that contains both the synchronous signal power and the power arising from the murmur noise. The signal in accumulator 22, which contains only the synchronous signal is squared by circuit 24 producing a signal proportional to the power of the synchronous signal and the resultant is subtracted from the signal stored in accumulator 28; this subtraction is performed in subtractor 30. Consequently, the output of subtractor 30 contains a signal that is representative of the power of the murmur over the number of pulses (100 in this example) that are analyzed. Such signal is normalized in amplitude by scaling circuit 33 so that when displayed on oscilloscope 32, or otherwise, the signal affords the clinician precise quantitative information on the character and timing of the murmur, from which nature of the stenosis can be appraised. Accordingly, vague and subjective information concerning cardiovascular murmurs is replaced by rather precise quantitative and objective information and low intensity murmurs that would not be detected by auscultation are detected by the present invention.

Thus it will be seen that the present invention provides a method and apparatus for detecting and quantifying the power of a random noise signal in a composite signal composed of a synchronous signal and a random noise signal. The invention affords separation of the random noise signal from a stronger synchronous signal so as to provide objective and accurate information concerning the character of the phenomenon that produces the random noise. Moreover, because virtually any number of time records can be averaged according to the invention, faint or inaudible murmurs that have heretofore gone undetected can be detected and quantified according to the invention.

Although one embodiment of the invention has been shown and described, it will be obvious that other adaptations and modifications can be made without departing from the true spirit and scope of the invention.

What is claimed is:

1. The method of analyzing cardiovascular sounds of the body comprising the steps of:
   a. detecting the sound signals produced repetitively from a source within the body;
   b. detecting a periodic condition in the body synchronous with said repetitively produced sound signals;
   c. synchronizing the detected sound signals with said periodic condition in the body synchronous with said detected sound signals;
   d. squaring said detected sound signals without filtering said detected sound to produce a data signal representative of the sound power of the detected signals;
   e. averaging a plurality of said squared sound signals over a plurality of successive time periods to obtain an average of the sound power of the composite signal for each point in the cardiac cycle;
   f. averaging a plurality of said detected sounds over a plurality of successive time periods to obtain an average of the detected signal amplitude for each point in time in the cardiac cycle;
   g. synchronizing the averaging of the detected sounds with said periodic condition in the body synchronous with said detected sound signals;
   h. squaring said average of the detected sounds to produce a sound data signal representative of the second power of the heart sound signal;
   i. subtracting the result of step (h) from the result of step (e);
   j. displaying the result from step (i);
   k. displaying the result from step (h).

2. The method as claimed in claim 1 wherein the step of synchronizing the detected sound signals with a periodic condition comprises the steps of synchronizing with an electro-cardiograph signal.

3. The method as claimed in claim 2 wherein the step of detecting the sound signals comprises passing the signals through an amplifier with large dynamic range and flat frequency response from 0Hz to 20,000 Hz.

4. The method as claimed in claim 1 wherein the steps of averaging a plurality of said squared sound signals and the step of averaging a plurality of said detected sounds signals comprises averaging over at least 64 signals.

5. The method as claimed in claim 1 wherein steps (d) through (k) are initiated only if the peak heart sound amplitude falls in a narrow band to improve the signal to noise ratio of said steps.

6. The method as claimed in claim 1 wherein the detected data is accepted in the subsequent averaging process only if the peak heart sound amplitude falls in a narrow band to improve the signal to noise ratio of said steps.

7. Apparatus for analyzing cardiovascular sounds of a body comprising,
- a transducer (12) to convert regular heartbeat and murmur sounds of said body to electrical signals;
- an amplifier (14) to produce amplified electrical signals from said transducer;
- a timing pulse generator (16) for deriving timing pulses from the ECG of said body;
- first means including filtering means for filtering out the murmur signals from the composite signal to produce a signal having just the heart sounds therein, discriminating means for determining when the maximum heart sound amplitude is within a pre-selected amplitude range and control means to generate a first control signal approximately of the duration of one heart beat of said body when said murmur heart sound amplitude signals are within said range;
- second means (18) connected to said timing pulse generator for producing a second control signal approximately of the duration of one heart beat of said body;
- a gate connected to said amplifier and arranged to pass said amplified electrical signal only when said first and second control signals are present at said gate;
- third means (26) connected to said gate for squaring said amplified electrical signal passed by said gate;
- fourth means (28) for accummulating and averaging the signal from said third means;
- fifth means (22) connected to said gate for accummulating and averaging a said amplified electrical signal passed by said gate;
- sixth means (24) for squaring the output of said fifth means 22;
- seventh means (30) for subtracting the output of said sixth 24 means from the output of said fourth (28) means; and
- seventh means (32) for displaying the outputs of both said sixth (24) means and said seventh (30) means.

8. Apparatus according to claim 7 wherein said timing pulse generator comprises means including at least two skin electrodes for sensing the ECG of the heart in the body, means for detecting one wave of the qrs complex of the ECG, and means for generating the timing pulse in synchrony with that one wave.

9. Apparatus according to claim 8 including means for discriminating against portions of the composite electrical signal outside a preselected amplitude range so as to eliminate signal variations arising from pressure changes consequent upon breathing.

* * * * *